United States Patent
Colrain et al.

(10) Patent No.: US 8,391,295 B2
(45) Date of Patent: Mar. 5, 2013

(54) TEMPORAL AFFINITY-BASED ROUTING OF WORKLOADS

(75) Inventors: Carol Colrain, Redwood Shores, CA (US); Michael Zoll, Foster City, CA (US); Rajkumar Irudayaraj, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 854 days.

(21) Appl. No.: 11/868,317

(22) Filed: Oct. 5, 2007

(65) Prior Publication Data
US 2009/0034537 A1 Feb. 5, 2009

Related U.S. Application Data

(60) Provisional application No. 60/962,947, filed on Jul. 31, 2007.

(51) Int. Cl.
*H04L 12/56* (2006.01)
(52) U.S. Cl. .................................................. 370/400
(58) Field of Classification Search .................. 370/235, 370/400; 709/203, 229
See application file for complete search history.

(56) References Cited

U.S. PATENT DOCUMENTS

| | | | | |
|---|---|---|---|---|
| 6,424,992 B2 * | 7/2002 | Devarakonda et al. | ....... | 709/203 |
| 2004/0003099 A1 * | 1/2004 | House et al. | ................. | 709/229 |
| 2008/0008095 A1 * | 1/2008 | Gilfix | ............................ | 370/235 |

* cited by examiner

*Primary Examiner* — Mark Rinehart
*Assistant Examiner* — Gbemileke Onamuti
(74) *Attorney, Agent, or Firm* — Hickman Palermo Truong Becker Bingham Wong LLP

(57) ABSTRACT

Techniques for routing client requests among a group of nodes offering a service are described. A coordinator determines that performance could be improved by using affinity-based routing. In one embodiment, the coordinator calculates a Time-to-Live (TTL) metric whereby clients benefit by returning to the same cache and posts this hint to subscribers. Client's start preserving locality data in an affinity context, such that later requests for a connection can be routed to the location last visited. The coordinator measures the system over subsequent intervals. If the gradient of the goodness (viz service quality and capacity) is stable or improving, then the coordinator continues to advise subscribers to use the affinity-based technique. Alternatively, if the gradient of the goodness is deteriorating, then the coordinator posts advice to the subscribers to stop using the affinity-based technique for any instance during the next intervals.

32 Claims, 3 Drawing Sheets

TEMPORAL AFFINITY-BASED ROUTING OF WORKLOADS

CROSS-REFERENCE TO RELATED APPLICATIONS AND CLAIM OF PRIORITY

This application claims priority to U.S. Provisional Patent Application Ser. No. 60/962,947, titled "TEMPORAL AFFINITY-BASED ROUTING OF WORKLOADS," filed on Jul. 31, 2007, and incorporated by reference in its entirety for all purposes as though fully set forth herein. This application is also related to the following applications, the contents of all of which are incorporated by reference in their entirety for all purposes as though fully set forth herein: U.S. patent application Ser. No. 10/917,715, filed on Aug. 12, 2004, titled "MANAGING WORKLOAD BY SERVICE"; U.S. patent application Ser. No. 10/917,663, filed on Aug. 12, 2004, titled "FAST REORGANIZATION OF CONNECTIONS IN RESPONSE TO AN EVENT IN A CLUSTERED COMPUTING SYSTEM"; U.S. patent application Ser. No. 10/917,661, filed on Aug. 12, 2004, titled "CALCULATION OF SERVICE PERFORMANCE GRADES IN A MULTI-NODE ENVIRONMENT THAT HOSTS THE SERVICES"; U.S. patent application Ser. No. 11/168,968, filed on Jun. 27, 2005, titled "CONNECTION POOL USE OF RUNTIME LOAD BALANCING SERVICE PERFORMANCE ADVISORIES"; and U.S. patent application Ser. No. 11/168,967, filed on Jun. 27, 2005, titled "RUNTIME LOAD BALANCING OF WORK ACROSS A CLUSTERED COMPUTING SYSTEM USING CURRENT SERVICE PERFORMANCE LEVELS".

FIELD OF THE INVENTION

The present invention relates to workload routing and, more specifically, to routing workloads among a cluster's nodes based on temporal affinity.

BACKGROUND

A "cluster" is a system that includes a plurality of nodes that, for the purposes of providing access to data, appear to clients as a single unit. Within a cluster, each node typically has its own processor(s) and volatile memory. Typically, the nodes of a cluster are able to communicate with each other using a communication mechanism, such as a network.

In a database system cluster, a database server instance executes on each node in the cluster. In such a cluster, a "working set" can be cached among different nodes. The "working set" includes data blocks that are actively used by the applications that are the clients of the cluster. In some clusters, replicas of such data blocks may be stored on a shared disk that each of the cluster's nodes can access. Replicas of such data blocks also may be stored in the caches of various nodes in the cluster. Some replicas of a data block may be more current than other replicas of that data block; replicas may be different versions of the same data block.

In some cluster configurations, a middle tier is situated in between the cluster's nodes and the clients. The middle tier may include several application servers (e.g., web servers), for example. The middle tier may receive requests from the clients (e.g., web browsers). The middle tier may route those requests among the cluster's nodes. In order to balance the request workload among the nodes, so that no particular node is overworked while other nodes sit idle, the middle tier may route requests to different nodes. Sometimes, the middle tier may route to different nodes requests that are related to the same data. For example, the middle tier may route, to a first node, a user's request to update the contents of that user's shopping cart, but then the middle tier may route, to a second node, the same user's request to view the contents of that user's shopping cart.

Before a particular node can perform request-specified operations on a particular data block's data, the particular node needs to have a current version of the particular data block. Often, the particular node will not have a current version of the particular data block in the particular node's cache, but a current version of the particular data block will be located in another node's cache. The particular node will then need to obtain the current version of the particular data block from the other node. When the middle tier widely disperses, among many different nodes, requests that are related to the same data, a significant amount of inter-node data block copying, or "shipping," may occur between the nodes. Unfortunately, each time that a data block replica is shipped from one node to another (over the inter-node communication mechanism), the cluster's performance suffers a bit.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
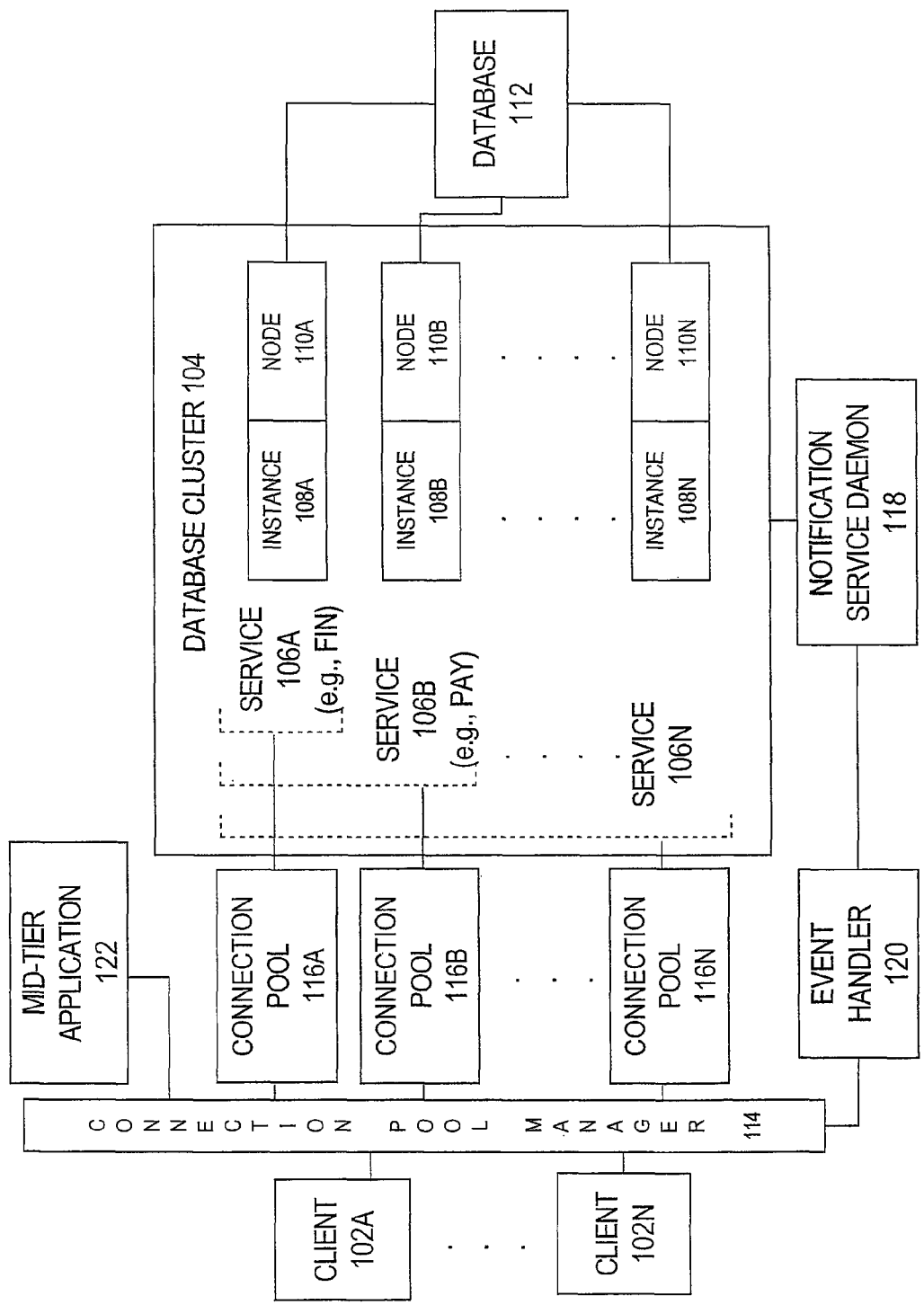
FIG. 1 is a block diagram that illustrates an operating environment in which an embodiment of the invention can be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Requests that are from the same user or web session, and requests that are related to the same data or database transaction, should be routed to the same node in a cluster of multiple nodes, while there is a response time benefit in doing so. When such related requests are routed to the same node, that node is more likely to have, in that node's cache, current versions of the data blocks that contain the data to which the requests are related. As a result, less inter-node data block shipping occurs, and the cluster's performance improves. Additionally, because replicas of the same data block are consequently less likely to be located in many different nodes' caches, each node's available cache space effectively increases. This effective increase in available cache space contributes to a higher global cache hit ratio in the cluster.

Server-Side Advises if Affinity-Based Routing Should be Used

Therefore, in one embodiment of the invention, an affinity coordinator at the server determines that the synchronization costs at each node are sufficiently high that performance could be improved by using affinity. In particular, during a first time interval, the coordinator assesses a response time gain per cache whereby it is beneficial for clients to return to (i.e., continue to interact with) the same cache. The coordinator posts the hint to use affinity to the mid-tier application servers. The middle tier application servers begin to use an affinity-based technique to distribute requests among the nodes during a second time interval.

In one embodiment of the invention, during the next performance measurement intervals, the coordinator determines whether the gradient of the goodness is stable or improving, where goodness is a weighting of service quality and available capacity for a service at an instance. Such goodness determinations are also used to perform "runtime load balancing," which is further described in U.S. patent application Ser. No. 11/168,968 and U.S. patent application Ser. No. 11/168,967. If the gradient of the goodness is stable or improving, then the coordinator continues to advise the mid-tier applications to use the affinity-based technique as opposed to the runtime load balancing of work during the next time intervals, and, in some embodiments of the invention, also publishes an updated time-to-live indicator (discussed further below). Alternatively, if the gradient of the goodness is deteriorating, then the use of the affinity-based technique was not successful, and the coordinator posts advice to the subscribers (i.e., the mid-tier applications) to stop using the affinity-based technique during the third time interval. During the third time interval, if it is determined that there is a larger response time gain by disabling affinity, this advice is posted and the subscribers (for example, mid-tiers) revert back to using the load-balancing technique alone instead.

In one embodiment of the invention, the affinity hint prescribed by the coordinator includes a "time-to-live" ("TTL") indicator (also referred to herein simply as a TTL). The TTL indicator is an estimate of the amount of time that it takes the data to age from a cache for each service. Consequently, the TTL indication is an estimate of the duration of time while it is beneficial to send clients to the same node, also known as affinity-based routing. The TTL takes into account the potential increase in time by virtue of using affinity-based routing. The TTL is built by the coordinator based on the amount of time that data are maintained each in cache. This information is defined per cache because caches may be different sizes and on different power nodes with different workload mixes. For some nodes affinity may be of no advantage, whereas for others affinity should be long lived.

Mid-Tier Application Server Applies the Affinity Device

In one embodiment of the invention, at first use by a client, the mid-tier application server establishes an affinity context. The affinity context records the service used, and which database and instance was used. The affinity context is preserved on the web session, such that at the next request from the client to the server (using any mid-tier application server), the client can be routed to the location last visited, according to the affinity hint prescribed in the advice. In one embodiment of the invention, when the web session concludes, the last time is recorded with the affinity context. The affinity hint includes a TTL. When the client next makes a request to the server, if the last access time is within TTL and the affinity hint is advised for that instance, then the mid-tier application server routes based on affinity. Conversely, if the last access time is beyond TTL, then the mid-tier application server dissolves the affinity context and uses the default load-balancing technique. In one embodiment of the invention, when the web session concludes, then the affinity context is dissolved. Under such circumstances, the connection pool subsequently follows a runtime connection load balancing algorithm. A new affinity context then may be established.

In one embodiment of the invention, while the middle tier is using the affinity-based technique as prescribed in the affinity hint, whenever the middle tier receives a request from a client for which no "affinity context" has yet been established, the middle tier (a) selects (e.g., based on the load-balancing technique) a node to which to route the request and (b) establishes such an affinity context for that client. The affinity context identifies the selected node. In one embodiment of the invention the affinity hint is Boolean (true/false) per instance. At the next request for a connection, while the affinity hint is advised (true) for that instance and service, whenever the middle tier receives a request from a client for which an affinity context has already been established to the instance, the middle tier routes that request to the same node that is identified in that client's affinity context.

In one embodiment of the invention, the affinity context is extended to record the time that the server was last used. At the next request to check a connection from the connection pool at the mid-tier application server, if the amount of time that has passed since the affinity context was established is greater than the duration specified in the affinity context's TTL indicator, then the middle tier considers the affinity context to have expired. Under such circumstances, the middle tier does not use the affinity context to select the node to which the middle tier will route the client's request; instead, the middle tier may apply a runtime load-balancing technique to select a potentially different node to which the middle tier will route the client's request. Additionally, under such circumstances, the middle tier may remove the expired affinity context and/or establish a new affinity context—with a new last access time—for the client. The use of the TTL indicator in this manner helps to prevent the affinity context from being used to route a client's requests needlessly to the same node again and again long after that node's cache has probably evicted the data block that contains the data to which the client's requests are related.

The affinity hint is also cancelled (time to live set to zero in one embodiment, or the Boolean set to false) when a high availability condition occurs. Examples of high availability conditions are node or instance failure or shutdown, service relocation off that instance, and hangs that deteriorate service such that affinity is not desirable. These conditions can occur at any time and are notified to the subscribers immediately that they are detected. In one embodiment of the invention, current affinity to a server node is invalidated in response to the existence of any of the following conditions: (a) when the server notifies the client to invalidate affinity; (b) when the web session concludes; or (c) when a high availability condition occurs. In one embodiment of the invention, condition (c) takes precedence over condition (b) and condition (a), and condition (b) takes precedence over condition (a).

EXAMPLE OPERATING ENVIRONMENT

FIG. 1 is a block diagram that illustrates an operating environment in which an embodiment of the invention can be implemented. Techniques that may be applied in such an operating environment, according to certain embodiments of the invention, are described further below, beginning in the section titled "STATES FOR DETERMINING THE AFFINITY ADVICE."

Embodiments of the invention may be implemented using one or more connection pool managers that are associated with a clustered computing system, such as a clustered database server comprising multiple database server instances executing on multiple host nodes to access and manipulate shared data stored on a data storage mechanism. The example operating environment of FIG. 1 is illustrated and described in the context of a clustered database server for purposes of discussion. However, it is contemplated that any distributed database server or distributed computing system could benefit from use of the broader techniques enabled herein. Therefore, embodiments of the invention are not limited to use with a clustered database system or connection pool manager.

One or more clients 102A-N are communicatively coupled to a database cluster 104. Clients 102A-N are applications that send requests to middle tier application 122, via a network, for example. Middle tier application 122 receives requests from clients 102A-N and responds to those requests, sometimes with data that middle tier application 122 obtains from database cluster 104. In one embodiment of the invention, clients 102A-N are web browsers such as Mozilla Firefox. In one embodiment of the invention, middle tier application 122 is an application server such as a web server. Although the embodiment of the invention illustrated in FIG. 1 shows one middle tier application 122, alternative embodiments of the invention may include and involve multiple middle tier applications, each of which intermediates between clients 102A-N and database cluster 104.

Database cluster 104 refers to database server instances 108A-N and nodes 110A-N on which instances 108A-N execute. Other components may also be considered a part of database cluster 104, such as a connection pool manager 114, connection pools 116A-N, a notification service daemon 118, and an event handler 120. The actual architecture in which the foregoing components are configured may vary from implementation to implementation.

One node of the database server is the elected master for determining the global affinity advice, and also the runtime load balancing advice, as discussed in U.S. patent application Ser. No. 11/168,968, filed on Jun. 27, 2005, titled "CONNECTION POOL USE OF RUNTIME LOAD BALANCING PERFORMANCE ADVISORIES." This master node observes the service quality, capacity, and cluster wait time for each service on every instance and builds an advisory. The advisory is posted using the notification system for use by the connection pool managers at the mid-tier application servers. All mid-tier application servers receive the same advice. In particular, the advice is available to all interested clients that use load balancing, including batch processing servers. The coordinator uses a state machine that, after determining that affinity should be set, then measures whether there was a benefit over the successive time intervals.

In FIG. 1, connection pool manager 114 and connection pools 116A-N are depicted as components not within database cluster 104 for purposes of example. Connection pool manager 114 is communicatively coupled to and utilized by middle tier application 122. In addition, connection pool managers 114 are logically coupled to connection pools 116A-N, which are logically coupled to database cluster 104. Notification service daemon 118 and event handler 120 are also depicted as not within database cluster 104, and are communicatively coupled to database cluster 104, in particular embodiments of the invention. U.S. patent application Ser. No. 10/917,663, filed on Aug. 12, 2004, titled "FAST REORGANIZATION OF CONNECTIONS IN RESPONSE TO AN EVENT IN A CLUSTERED COMPUTING SYSTEM," contains additional relevant information.

Database 112 comprises data and metadata that is stored on a persistent storage mechanism, such as a set of hard disks that are communicatively coupled to nodes 110A-N, each of which is able to host one or more instances 108A-N, each of which hosts at least a portion of one or more services. Such data and metadata may be stored in database 112 logically, for example, according to object-oriented constructs, object-relational constructs, relational constructs, multidimensional constructs, or a combination of relational and multidimensional database constructs. Nodes 110A-N can be implemented as conventional computer systems, such as computer system 300 illustrated in FIG. 3.

A database server, such as each of instances 108A-N, is a combination of integrated software components and an allocation of computational resources (such as memory and processes) for executing the integrated software components on a processor, where the combination of the software and computational resources are used to manage a particular database, such as database 112. Among other functions of database management, a database server typically governs and facilitates access to database 112 by processing requests from clients 102A-N to access the database 112. Therefore, connection pool managers 114, which manage connections to database cluster 104, can be implemented as a processing layer between clients 102A-N and instances 108A-N, which manage access to database 112. Instances 108A-N, in conjunction with respective nodes 110A-N, host services, described below. The notification of affinity advice is posted from the database server to the connection pool managers using the notification service.

Services

Services are a logical abstraction for managing workloads. A service, such as service 106A-N, is a grouping of work of a particular type or category, where the work performed is for the benefit of one or more clients of one or more servers, and where a level or quality of performance and availability are prescribed for the particular type or category of work. The work performed as part of a service includes any use or expenditure of computer resources, including, for example, CPU processing time, storing and accessing data in volatile memory and read and writes from and/or to persistent storage (i.e., I/O processing), and use of network or bus bandwidth.

In general, a service is work that is performed by a database server and typically includes the work performed to process and/or compute queries that require access to a particular database. The term "query" as used herein refers to a statement that conforms to a database language, such as Structured Query Language (SQL), and includes statements that specify operations to add, delete, or modify data and create and modify database objects, such as tables, objects views, and executable routines.

A single database may support many services. For a non-limiting example, services may be divided into a FIN service and a PAY service, where the FIN and PAY services share the clustered database. The FIN service is the database service performed by cluster 104 for a FIN application. Typically, the FIN service involves accessing database objects on database 112 that store data for FIN applications. The PAY service is the service performed by cluster 104 for PAY applications. Typically, the PAY service involves accessing database objects on database 112 that store data for PAY applications. The FIN and PAY service each provide a logical grouping of work. Each spans one or more nodes of the cluster.

Database instances of a database cluster are allocated to support one or more services. When a database instance (or node) is allocated to perform a service, the database instance is referred to herein as hosting, running, or providing the service, and the service is referred to herein as running or being placed on the database instance.

Services can be provided by one or more database server instances. The service on each instance is referred to as a master of that service. Thus, multiple server instances may work together to provide a service to a client. In FIG. 1, service 106A (e.g., FIN) is depicted, with dashed brackets, as being provided by instance 108A, service 106B (e.g., PAY) is depicted as being provided by instances 108A and 108B, and service 106N is depicted as being provided by instances 108A-N.

Connection Pool Manager and Connection Tools

A connection pool is a named group of identical connections to the database. These connections are created when the connection pool is registered. Applications that interact with the database borrow connections from the pool, use the connections to execute work requests, and then return the connections to the pool. Connection pools operate by creating connections infrequently and keeping the connections in the connection pool for a long duration. Work requests come into the connection pool with high frequency, borrow these connections, and exist for relatively short duration.

As described herein, work requests can be distributed across the instances of a cluster offering a service, using (1) the service performance, e.g., as represented by response time and/or throughput; (2) available resource capacity, e.g., resource profile; and (3) service resource needs, e.g., service demand. A goodness metric is derived based on these data for the purposes of load balancing. In one embodiment of the invention, balancing of work requests occurs at two different times—at connect time and at runtime. The routing advice is built at the server and posted to all connection pool managers for runtime load balancing and to the listeners for connection load balancing.

The connection pool manager 114 is a software component. Connection pool manager 114 manages connection pools 116A-N and requests for connections for web sessions with cluster 104, including the routing of connection requests to the appropriate connection pool 116A-N, based on the pool setup and configuration. Each connection pool 116A-N is a set of connections to database sessions. Each session, for which communications between a client 102A-N and an instance 108A-N are transmitted through one of the connections from a respective connection pool 116A-N, is considered a session with an instance 108A-N.

Each connection can be instantiated as a connection object. For each connection object, the following information is recorded when a database session connection is established: (1) the service that the session is using; (2) the name of the node on which the associated service is available and to which this connection belongs; (3) the unique name of the database in use; and (4) the name of the instance to which this connection's database session belongs. Thus, the location (at times referred to as the "signature") of each session is uniquely identified. The manner in which the signature is recorded may vary from implementation to implementation. For non-limiting examples, a signature may be recorded to a bulletin board mechanism that is accessible to various subscribers, or the signature may be stored in an indexed table or a hash table. The signature is also returned to the connection pool in various ways. In one embodiment of the invention, an affinity context is introduced. The affinity context extends the preservation of the signature to the client and between connection pool managers—the affinity context maintains and carries this signature so that, at the next connection request, the connection pool manager knows the last signature that was used. In one embodiment of the invention, a handle is used as part of a connection conversation. Detailed actions that various subscribers may perform in response to notification events are beyond the scope of this description.

Generally, each connection pool manager 114 is responsible for creation, maintenance and removal of connections and connection pools 116A-N. For example, connection pool manager 114 may be used to manage connection pools 116A-N through use of a set of APIs. In addition, connection pool manager 114 binds a connection pool 116A-N to its corresponding data source object. In this context, a data source object is an abstraction of an interface to the database 112. Hence, binding a connection pool to a data source object may include mapping the connection pool to the data source object via a URL that identifies the associated service and the port through which the database 112 is accessed for the service.

A particular service, such as any of services 106A-N, may be provided by one or more instances 108A-N. A particular service is associated with a particular connection pool 116A-N that consists of multiple connections to the one or more instances. For example, service 106A may be provided through connections from connection pool 106A; service 106B may be provided by connections from connection pool 106B; and service 106N may be provided by connections from connection pool 106N. Such an association, or mapping, can be implemented by setting and maintaining URLs that identify the instances 108A-N that can provide a given service 106A-N, where such an association is maintained by connection pool manager 114. The database publishes many services. Connection pools 116A-N can use any service that is identified, such as by the URL or a connect string.

In one embodiment of the invention, mid-tier application 122 routes a request from a particular client to a particular server by obtaining, from connection pool manager 114, an already-established but currently unused connection (from one of connections pools 116A-N) to the particular node. Mid-tier application 122 may then provide, to the particular client, a handle to the obtained connection so that the particular client can send the request over the connection.

Notification Service—Advisories

In general, a daemon is a process that runs in the background and that performs a specified operation at predefined times or in response to certain events. In general, an event is an action or occurrence whose posting is detected by a process. Notification service daemon 118 is a process that receives alert and advisory information from cluster 104, such as from background manageability monitors that handle automatic management functions of instances 108A-N. Cluster 104 posts events high availability (up and down conditions) and advice for distributing load automatically and periodically, for subscribers to such events, such as connection managers, listeners, and job schedulers 102A-N. In one embodiment, service level performance events are posted periodically based on the service request rate.

Notification service daemon 118 has a publisher-subscriber relationship with event handler 120 through which high availability and load balancing events that are received by daemon 118 from cluster 104 is transmitted as events to event handler 120. In general, an event handler is a function or method containing program statements that are executed in response to an event. In response to receiving event information from daemon 118, event handler 120 passes along the event type and attributes. A single event handler 120 is depicted in FIG. 1 as serving all subscribers. However, different event handlers may be associated with different subscribers. The manner in which handling of advisory events is implemented by various subscribers to such events may vary from implementation to implementation. In one embodiment of the invention, the determination of whether to route client requests based on a load-balancing technique or an affinity-based technique is based on periodically measured cluster performance information that is contained in such advisory events. In one embodiment of the invention, the affinity hint is posted together with the load balancing advice. The affinity hint includes whether affinity should be used for a service at a particular node, and, in one embodiment of the invention, the time-to-live for the affinity of the service at a particular node.

For a non-limiting example, notification service daemon 118 may use the Oracle Notification System (ONS) API, which is a messaging mechanism that allows application components based on the Java 2 Platform, Enterprise Edition (J2EE) to create, send, receive, and read messages. Notification is also posted using advanced queues to OCI applications to use FAN and Load Balancing Advice, and over native TCP to listeners for advice for Connection Load Balancing.

Building the Affinity Advice

Figure 2:
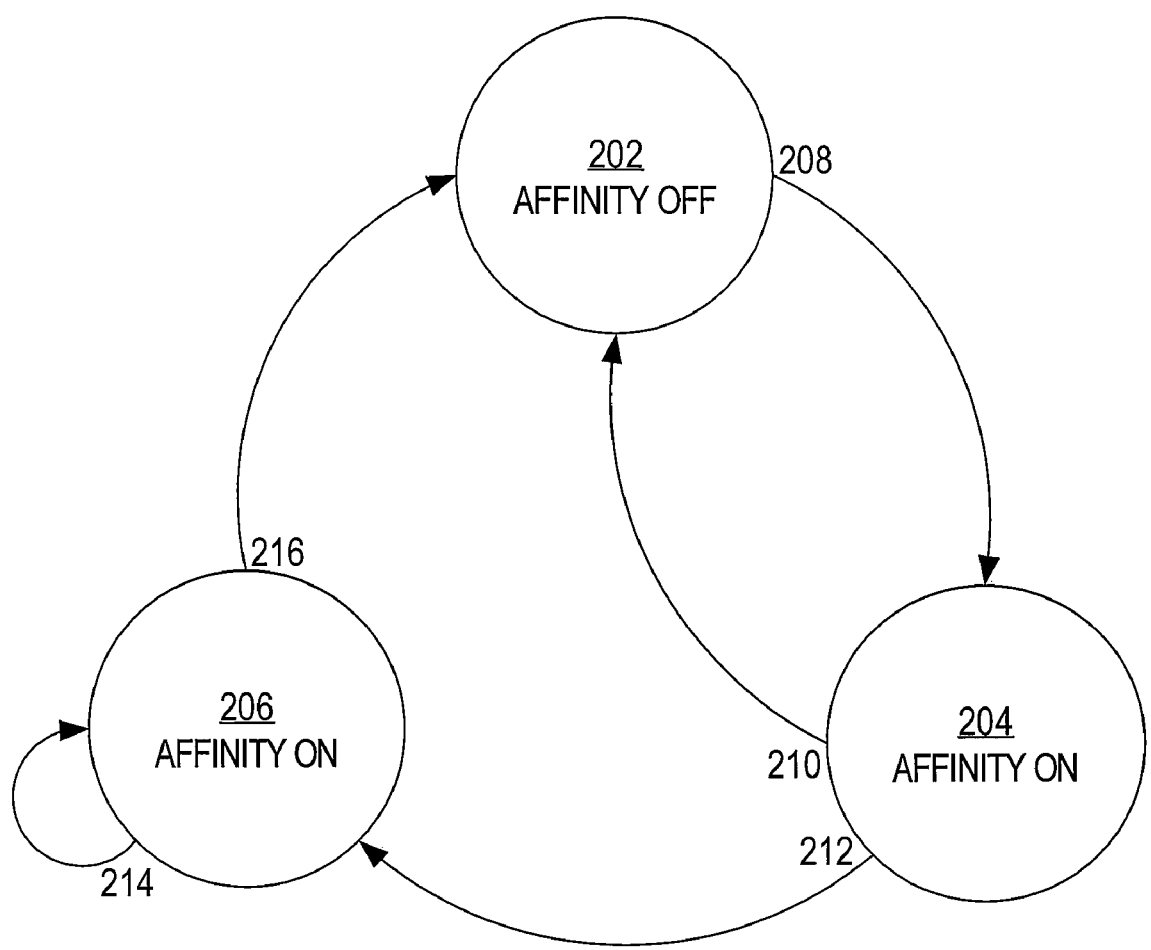
FIG. 2 illustrates a state diagram that is employed in one embodiment of the invention.

According to one embodiment of the invention, an elected coordinator at the server (e.g., at one of instances 108A-N) builds the affinity advice (also referred to as the "affinity state" below) as part of building the runtime load balancing advice. FIG. 2 illustrates a state diagram to which the behavior of the affinity state conforms in one embodiment of the invention. The state diagram includes states 202-206 and state transitions 208-216. In one embodiment of the invention, the affinity state is one of states 202-206 at any given time. In one embodiment of the invention, after the affinity state has been a particular state for a specified time interval, the coordinator transitions the affinity state from its current state to one of states 202-206 (and potentially to the same state in the case of transition 214). For example, the specified time interval might be two minutes. The state to which the coordinator transitions the affinity state at the end of a time interval depends on both the current affinity state, and other conditions that exist at that time.

In one embodiment of the invention, the current affinity state during a particular time interval determines, at least in part, the technique that mid-tier application servers (and other clients for the advice) will use to route or distribute requests from clients 102A-N among nodes 110A-N during that particular time interval. While the affinity state is state 202, the mid-tier application servers do not use an affinity-based technique to route requests from clients 102A-N to nodes 110A-N; instead, while the affinity state is state 202, mid-tier applications and other clients for the advice distribute requests to check-out connections from clients 102A-N among nodes 110A-N using a load-balancing technique (e.g., run-time load balancing) that is designed to equalize the service quality and capacity that each of nodes 110A-N bears, so that response time is optimized and no node is overloaded. Thus, while the affinity state is state 202, affinity is "off."

In contrast, in such an embodiment of the invention, while the affinity state is either state 204 or state 206, mid-tier applications and other clients of the advice attempt, for each of clients 102A-N (or, at least for those of clients 102A-N for which a non-expired affinity context has been established), to route request to check-out connections from that client to the same one of nodes 110A-N to which mid-tier application 122 routed the previous request from that same client. Thus, while the affinity state is either state 204 or state 206, affinity is "on." An example of the behavior of the system while affinity is "on" is described below.

Temporal Affinity-Based Routing

In one embodiment of the invention, while the affinity state is either state 204 or state 206, whenever mid-tier application 122 receives a request from one of clients 102A-N, mid-tier application 122 determines whether an affinity context has been established for that particular client. In one embodiment of the invention, mid-tier application 122 makes this determination by determining whether a "cookie" that represents such an affinity context is present on the machine on which the particular client executes.

In one embodiment of the invention, if an affinity context has not yet been established for the particular client, then mid-tier application 122 does the following. First, mid-tier application 122 selects one of nodes 110A-N (e.g., using a load-balancing technique). Next, mid-tier application 122 establishes an affinity context for the particular client. The affinity context is data that identifies the selected node (and potentially other information). In one embodiment of the invention, mid-tier application 122 establishes the affinity context for the particular client by causing the particular client to store, on the machine on which the particular client executes, a "cookie" that represents the affinity context. Then, the request is routed to the selected node. Although an embodiment of the invention that employs a cookie is discussed above, in an alternative embodiment of the invention, HTTPSession is used instead of a cookie. In such an alternative embodiment of the invention, the affinity context piggybacks the HTTPSession. When the session object propagates, the affinity context is preserved across nodes for the same web session.

Alternatively, in one embodiment of the invention, if an affinity context has already been established for the particular client, and if the advice from the coordinator is to use affinity (and, in one embodiment of the invention, if the TTL indicator in the affinity context indicates that the affinity context has not yet expired), then mid-tier application 122 does the following. First, mid-tier application 122 determines which one of nodes 110A-N is identified in the particular client's affinity context. In one embodiment of the invention, mid-tier application 122 makes this determination by reading an affinity context-representing "cookie" that is present on the machine on which the particular client executes. Then, mid-tier application 122 routes the request to the node, database, and instance that is identified in the particular client's affinity context. As a result, while the affinity state is either state 204 or state 206, mid-tier application 122 tends to route a particular client's requests to the same one of nodes 110A-N. Hopefully, the cache of the node to which a particular client's requests are routed is likely to contain a current version of a data block that contains data to which the client's requests pertain. It is the job of the coordinator to review the global state of the server and to provide advice about when affinity should be used.

Affinity is cancelled, when a high availability condition occurs. Examples of high availability conditions are node or instance failure or shutdown, service relocation off that instance, and hangs that deteriorate service such that affinity is not desirable. These conditions can occur at any time and are notified to the subscribers immediately that they are detected. The mid-tier aborts and cleans up all connections in the pool associated with the node, instance or service, and excludes the instance and node from the configuration state maintained at the mid-tier. U.S. patent application Ser. No. 10/917,663, filed on Aug. 12, 2004, titled "FAST REORGANIZATION OF CONNECTIONS IN RESPONSE TO AN EVENT IN A CLUSTERED COMPUTING SYSTEM," contains additional relevant information. If an affinity context is received requesting that instance and service, the affinity context is cleared and load balancing is used.

Transitions Between Affinity States

In one embodiment of the invention, the coordinator receives service response time, throughput, cluster wait, and capacity data from each other node (e.g., nodes 110A-N) in the cluster. This is the same performance data that is collected for runtime load balancing. The coordinator builds affinity advice for each service and includes this affinity advice with the runtime load balancing advice. The coordinator makes a separate decision for each service, and each node providing that service on a per-node basis, as to whether affinity should be enabled or dissolved. The affinity advice is published with the runtime load balancing advice to subscribers.

As is discussed above, in one embodiment of the invention, for each affinity decision, the coordinator transitions the affinity state to one of states 202-206 at the end of each specified time interval. In one embodiment of the invention, the state to which the coordinator transitions the affinity state at the end of a time interval is based at least in part on the value of a system characteristic that was measured during that time interval. For example, the system characteristic should be consistent with the load balancing algorithm. For example the gradient of the goodness value such that the affinity guidance, runtime load balancing, and connection load balancing are coordinated. Goodness provides a node strength and is an improved metric over pure response time or throughput.

In one embodiment of the invention, for each affinity decision, the state to which the coordinator transitions the affinity state at the end of a time interval is based at least in part on a combination of values of different system characteristics that were measured during that time interval. In one embodiment of the invention, the state to which the coordinator transitions the affinity state at the end of a time interval is based at least in part on a comparison of (a) values of one or more system characteristics that were measured during the most recent time interval to (b) values of those same system characteristics that were measured during some time interval that preceded the most recent time interval.

In one embodiment of the invention, one characteristic of database cluster 104 that is periodically measured, and upon which the determination of whether to use an affinity-based technique or a load-balancing technique to route requests to nodes 110A-N is at least partially based, is called "goodness." In one embodiment of the invention, "goodness" is a characteristic that factors in both (a) the cluster wait time experienced by nodes 110A-N per client request and (b) the capacities of and workload burdens on nodes 110A-N. A relatively low cluster wait time positively influences "goodness," while a relatively high cluster wait time negatively influences "goodness." If one or more of nodes 110A-N is overburdened with workload, then this fact negatively influences "goodness." Conversely, if none of nodes 110A-N is overburdened with workload, then this fact positively influences "goodness." In various different embodiments of the invention, "goodness" may be based on factors in addition to or instead of those expressly discussed above. In one embodiment of the invention, the "goodness" of each of nodes 110A-N, and/or the "goodness" of each of services 106A-N, is computed using the technique described in U.S. patent application Ser. No. 10/917,661, filed on Aug. 12, 2004, titled "CALCULATION OF SERVICE PERFORMANCE GRADES IN A MULTI-NODE ENVIRONMENT THAT HOSTS THE SERVICES," which is incorporated by reference herein.

In one embodiment of the invention, for each affinity decision, at the end of each time interval, a change in "goodness" of an entity or set of entities is calculated according to the formula $$((G(n)_{max} - G(n)_{min}) - (G(n-1)_{max} - G(n-1)_{min}))/(G(n-1)_{max} - G(n-1)_{min}),$$

where $G(n)_{max}$ is the maximum "goodness" measured during the most recent time interval (n), $G(n)_{min}$ is the minimum "goodness" measured during the most recent time interval (n), $G(n-1)max$ is the maximum "goodness" measured during the immediately previous time interval (n−1), and $G(n-1)min$ is the minimum "goodness" measured during the immediately previous time interval (n−1). In one embodiment of the invention, if the value produced by this formula is greater than a specified threshold (e.g., 20%), then this fact is an indication that the "goodness" has deteriorated excessively during the most recent time interval (n). As is discussed below, such an excessive deterioration in "goodness" may lead the coordinator to advise mid-tier application 122 to apply a load-balancing technique instead of an affinity-based routing technique during a next time interval.

In one embodiment of the invention, each of nodes 110A-N contains a monitoring mechanism that measures and records the values of one or more specified system characteristics. In one embodiment of the invention, these values are reported, using components shown in FIG. 1, to the coordinator. The coordinator develops, based on these values, the advice as to whether to maintain affinity for each service and for each node providing that service. In one embodiment of the invention, these values are represented within the work distribution advisory events that are reported to event handler 120 as described above.

In one embodiment of the invention, if, at the end of a most recent time interval, the affinity state is state 202, and if the average per-request cluster wait time during the most recent time interval is higher than a specified threshold value at that instance, then the coordinator transitions the affinity state from state 202 to state 204. This transition is represented in FIG. 2 as transition 208. Under such circumstances, the coordinator attempts to improve (lower) the average per-request cluster wait time during the next time interval by advising mid-tier application 122 to use the affinity-based routing technique during that time interval.

In one embodiment of the invention, if, at the end of a most recent time interval, the affinity state is state 204 at an instance, and if either (a) the average per-request cluster wait time measured during the most recent time interval is not lower than the average per-request cluster wait time measured during the time interval immediately preceding the most recent time interval or (b) the "goodness" measured during the most recent time interval has deteriorated by at least 20% in comparison to the "goodness" measured during the time interval immediately preceding the most recent time interval, then the coordinator transitions the affinity state from state 204 to state 202. This transition is represented in FIG. 2 as transition 210. Under such circumstances, the coordinator recognizes that using the affinity-based routing technique during the most recent time interval either (a) did not improve (lower) the average per-request cluster wait time or (b) significantly deteriorated "goodness," and so the coordinator attempts to equalize the workloads that nodes 110A-N bear by advising mid-tier application 122 to revert to the load-balancing technique (e.g., run-time load balancing).

In one embodiment of the invention, if, at the end of a most recent time interval, the affinity state is state 204, and if both (a) the average per-request cluster wait time measured during the most recent time interval is lower than the average per-request cluster wait time measured during the time interval immediately preceding the most recent time interval and (b) the "goodness" measured during the most recent time interval has deteriorated by less than 20% (if at all) in comparison to the "goodness" measured during the time interval immediately preceding the most recent time interval, then the coordinator transitions the affinity state from state 204 to state 206. This transition is represented in FIG. 2 as transition 212. Under such circumstances, the coordinator recognizes that using the affinity-based routing technique during the most recent time interval improved (lowered) the average per-request cluster time without significantly deteriorating "goodness," and so the coordinator continues to advise mid-tier application 122 to employ the affinity-based technique.

The coordinator cancels affinity immediately a high availability condition occurs. Examples of high availability conditions are node or instance failure or shutdown, service relocation off that instance, and hangs that deteriorate service such that affinity is not desirable. These conditions can occur at any time and are notified to the subscribers immediately that they are detected. The mid-tier aborts and cleans up all connections in the pool associated with the node, instance or service, and excludes the instance and node from the configuration state maintained at the mid-tier. U.S. patent application Ser. No. 10/917,663, filed on Aug. 12, 2004, titled "FAST REORGANIZATION OF CONNECTIONS IN RESPONSE TO AN EVENT IN A CLUSTERED COMPUTING SYSTEM," contains additional relevant information. If an affinity context is received requesting that instance and service, the mid-tier application 122 clears the affinity context and uses load balancing to satisfy the connection request.

In one embodiment of the invention, if, at the end of a most recent time interval, the affinity state is state 206, and if the "goodness" measured during the most recent time interval has deteriorated by less than 20% (if at all) in comparison to the "goodness" measured during the time interval immediately preceding the most recent time interval, then the coordinator maintains the affinity state as state 206 during the next time interval. This is represented in FIG. 2 as transition 214. Under such circumstances, the coordinator recognizes that continuing to use the affinity-based routing technique during the most recent time interval did not significantly deteriorate "goodness," and so the coordinator continues to advise mid-tier application 122 to employ the affinity-based technique. These state changes are on a per service and per instance basis, such that affinity can be enabled or dissolved per location.

In one embodiment of the invention, if, at the end of a most recent time interval, the affinity state is state 206, and if the "goodness" measured during the most recent time interval has deteriorated by at least 20% in comparison to the "goodness" measured during the time interval immediately preceding the most recent time interval, then the coordinator transitions the affinity state from state 206 to state 202. This transition is represented in FIG. 2 as transition 216. Under such circumstances, the coordinator recognizes that using the affinity-based routing technique during the most recent time interval significantly deteriorated "goodness," and so the coordinator 122 attempts to equalize the workloads that nodes 110A-N bear by advising mid-tier application 122 to revert to the load-balancing technique (e.g., run-time load balancing).

Time-to-Live Indicator

In certain embodiments of the invention described above, all of the requests that come from a particular client, or all of the requests that pertain to a particular service, or all of the requests that are associated with a particular web session, are routed to the same node. This affinity-based request routing is performed in hopes that the node's cache still contains the data blocks that contain the data to which the requests pertain. As is discussed above, affinity-based request routing is performed with the goal of minimizing inter-node data block shipping.

However, sometimes a considerable amount of time may pass in between the moments at which related requests are sent to the mid-tier application connection pool. For example, a user of client 102A might begin multiple requests, but then leave his computer for an extended period of time before returning to complete the transaction. By the time the user resumes the transaction, the node with which client 102A has affinity might have evicted, from that node's cache, all of the data blocks that contain data to which the transaction pertains (in order to make room for other data blocks that contain data that pertain to other, more active transactions). By that time, the most current versions of the data blocks that contain data to which the transaction pertains might be stored in the caches of other nodes with which client 102A has no affinity relationship. Under such circumstances, continuing to route the transaction-related requests to the same node with which client 102A has an affinity relationship might adversely impact the performance of database cluster 104. Under such circumstances, it might be preferable to resume routing requests from client 102A among nodes 110A-N using a load-balancing technique.

Therefore, in one embodiment of the invention, the coordinator calculates a time-to-live (TTL) for each service for each cache. The TTL may vary from implementation to implementation, but in one embodiment of the invention, the amount of time is calculated to approximate the average amount of time that a data block remains in a node's cache. This information is provided in the affinity advice posted to the subscribers. In one embodiment of the invention, the TTL is a finite TTL indicator that indicates how long, after the affinity context's establishment, the affinity context will remain valid.

In one embodiment of the invention, when an affinity context is established, the affinity context records the last time that the client checked the connection back to the connection pool manager.

In one embodiment of the invention, after the specified amount of time has passed since the establishment of the affinity context, the affinity context is considered to have expired. Connection pool manager 114 does not use expired affinity contexts when making request routing decisions. In one embodiment of the invention, expired affinity contexts are deleted. In one embodiment of the invention, expired affinity contexts are not deleted, but instead remain dormant and unused until those affinity contexts are updated the next time that a new affinity relationship is established between a client/web session/service/unique database name and a node.

As a result, in one embodiment of the invention, connection pool manager 114 does not doggedly route requests to the same node long after the benefit of doing so has evaporated.

Granularity of Application of Affinity-Based Technique

In one embodiment of the invention, there is a transition period whereby some clients were load balanced and some now using affinity. However, after the transition period is complete all connection managers should be using the advice. In one embodiment of the invention, the determination of whether to apply the affinity-based technique when routing requests from a particular client or when routing requests that pertain to a particular service is based on whether the value of some characteristic (e.g., goodness metric comprising the average server response time, average cache wait time, and throughput) of the entire system might be improved by applying the affinity-based technique to those particular kinds of requests. In such an embodiment of the invention, regardless of how many mid-tier applications there are, all mid-tier applications receive the same advice from the coordinator. Thus, in one embodiment of the invention, whether or not the affinity-based technique is used at any particular time is based on whether use of the affinity-based technique might improve the measurement(s) of the characteristic(s) of database cluster 104 as a whole—even if the measurement(s) of the characteristic(s) of a particular node in database cluster 104 might not individually improve. However, in another embodiment of the invention, the determination of whether to apply the affinity-based technique when routing requests from a particular client or when routing requests that pertain to a particular service is based on whether the value of some characteristic of the transaction requires affinity. In particular, to support XA transactions (also called "global transactions"), once an XA transaction has started, all subsequent branches of the same transaction should be sent to the same node using the affinity context. The mid-tier application server does not use the affinity advice in this case. By virtue of the transaction being of type XA, the affinity context is applied while the transaction is in progress. When the transaction completes, the mid-tier application reverts to the load-balancing algorithm for the connection pool—for example, based on the affinity advice or runtime load balancing. In one embodiment of the invention, when a transaction is a global transaction, then the server-side time-to-live indicator is ignored; in the case of such a global transaction, the affinity context is not necessarily dissolved in response to the conditions discussed above, but, instead, the affinity context is established after the first connection is borrowed from the connection pool. Under such circumstances, affinity is maintained for the life of the global transaction.

EXAMPLE AFFINITY CONTEXT

In one embodiment of the invention, the affinity context is data that is represented by a "cookie" that is stored on one of clients 102A-N. In one embodiment of the invention, the affinity context contains the following information: (i) a version of an event payload, which may be used to identify changes in versions of database cluster 104; (ii) a service name, such as a name of one of services 106A-N; (iii) a database name that is unique to a database that is supporting the named service, such as a name of database 112; (iv) a name of an instance that is supporting the named service, such as a name of one of instances 108A-N; (v) a connection pool identifier, such as an identifier of one of connection pools 116A-N; and (vi) a connection identifier, such as an identifier of a connection that was last allocated in the identified connection pool. In one embodiment of the invention, mid-tier application 122 attempts to route a client's requests (or requests that pertain to the service named in the affinity context) to the node, database, and instance named in the affinity context executes, using the connection identified in the affinity context.

In one embodiment of the invention, the affinity context also includes a "last access time" which indicates the last time that the named database and the named instance were used. As is described above, in one embodiment of the invention, the coordinator advises the TTL value that each mid-tier connection pool should apply.

Hardware Overview

Figure 3:
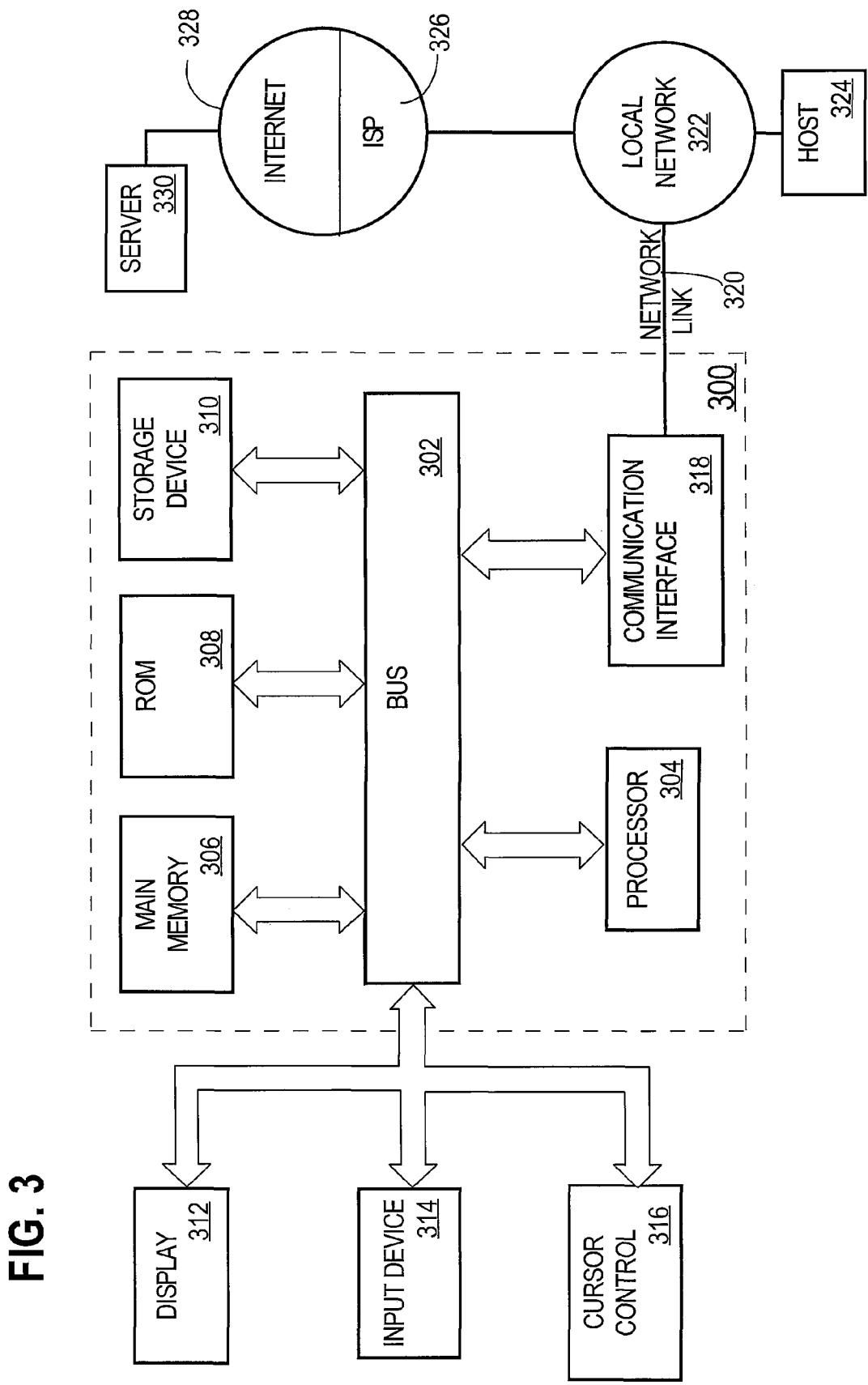
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 300, various computer-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for distributing requests, the method comprising:
a coordinator within a database server cluster (a) developing advice as to whether affinity-based routing would benefit a service at a node in the database server cluster and (b) posting the advice to one or more middle-tier servers that send requests to and receive responses from database servers in the database server cluster;
determining whether a potential gain in performance in the database server cluster can be achieved by using affinity-based routing in the database server cluster;
in response to determining that a potential gain in performance in the database server cluster can be achieved by using affinity-based routing in the database server cluster, recommending, in the advice, to distribute requests to nodes in the database server cluster to preserve client-to-node affinity for requests from the same client;
after recommending, collating performance characteristics of the database server cluster;
based on collating the performance characteristics, measuring a potential loss in performance in the database server cluster;
in response to measuring a potential loss in performance in the database server cluster, removing the advice to distribute requests to nodes in the database server cluster to preserve client-to-node-affinity; and
wherein the method is performed by one or more computing devices.

2. The method of claim 1, further comprising:
determining an amount of time that affinity is expected to be beneficial based on a rate that data ages from caches of nodes in the database server cluster; and based on determining an amount of time that affinity is expected to be beneficial,
publishing a time-to-live for affinity to be used by clients;
wherein affinity is temporal.

3. The method of claim 1, wherein the step of developing advice comprises developing advice based on a characteristic of the database server cluster, and wherein the characteristic is a weighting of change in goodness, including response time and capacity, across multiple iterations, and wherein goodness is computed using a formula: $((G(n)_{max}-G(n)_{min})-(G(n-1)_{max}-G(n-1)_{min}))/(G(n-1)_{max}-G(n-1)_{min})$ for each iteration (n), where $G(n)_{max}$ is the maximum goodness measured during iteration (n), $G(n)_{min}$ is the minimum goodness measured during iteration (n), $G(n-1)_{max}$ is the maximum goodness measured during iteration (n−1), and $G(n-1)_{min}$ is the minimum goodness measured during iteration (n−1).

4. A computer-implemented method comprising:
obtaining a measurement of a characteristic of a system;
determining whether the measurement satisfies specified criteria; and
in response to determining that the measurement does not satisfy the specified criteria, distributing requests from one or more clients among two or more nodes of the system based on an affinity-based technique;
wherein distributing requests based on the affinity-based technique comprises sending all requests that come from each client of the one or more clients to a particular node of the two or more nodes while an affinity relationship exists between said each client and the particular node and a particular service; and
wherein the characteristic is an average time taken by nodes in the system to receive replicas of data blocks that were requested from other nodes in the system;
wherein each node in the system is a separate database server instance with a cache that stores data blocks;
wherein the method is performed by one or more computing devices.

5. The method of claim 4, wherein determining whether the measurement satisfies specified criteria comprises determining whether a gradient of goodness has deteriorated below a specified threshold.

6. The method of claim 4, wherein the characteristic is based on both (a) cluster wait time and (b) capacities of nodes in the system.

7. The method of claim 4, further comprising:
during a particular time interval, obtaining a measurement of a quality of the system;
determining whether a quality of the system has deteriorated to at least a specified degree during the particular time interval;
in response to determining that the quality has deteriorated to at least the specified degree during the particular time interval, posting advice to distribute, based on a load-balancing technique instead of an affinity-based technique, requests during a successive time interval that is subsequent to the particular time interval.

8. The method of claim 4, further comprising:
during a first time interval, obtaining a first measurement of a first cluster wait time in the system;
during a second time interval, obtaining a second measurement of a second cluster wait time in the system;
determining whether the second measurement is less than the first measurement; and
in response to determining that the second measurement is not less than the first measurement, posting advice to distribute, based on the load-balancing technique instead of the affinity-based technique, requests during a third time interval that is subsequent to the second time interval.

9. The method of claim 4, further comprising:
during a first time interval, obtaining a first measurement of a first cluster wait time in the system and determining that a potential advantage can be gained by enabling affinity;
during a second time interval, obtaining iterative measures of a goodness of the system;
determining whether a gradient of the goodness is improving or stable;
in response to determining that (a) the gradient of the goodness is stable or improving, providing advice to distribute, based on the affinity-based technique, requests for subsequent measurement intervals; and
iteratively verifying that the gradient of the goodness is stable or improving and updating the advice based on the gradient of the goodness.

10. The method of claim 4, further comprising:
establishing an affinity context that extends preservation of a location that the client last used to the client whereby the affinity context comprises sufficient data to route the client back to the same database and instance that was used on a last request for a connection to the server;
wherein the affinity context is available for later requests to provide connections at the same or different connection pool managers and listeners.

11. A computer-implemented method for distributing requests, the method comprising:
during a first time interval, distributing, based on a non-affinity load-balancing technique, requests from one or more clients among two or more nodes in a system;
during the first time interval, obtaining a measurement of a characteristic of the system;
determining whether the measurement satisfies specified criteria; and
if the measurement does not satisfy the specified criteria, then, during a second time interval that is subsequent to the first time interval, distributing requests from at least one of the one or more clients among the two or more nodes based on an affinity-based technique, thereby switching from the non-affinity load-balancing technique to the affinity-based technique in between the first time interval and the second time interval;
wherein distributing requests based on the affinity-based technique comprises sending all requests that come from a particular client to a particular node of the two or more nodes while an affinity relationship exists between the particular client and the particular node;
wherein the method is performed by one or more computing devices.

12. The method of claim 11, further comprising:
dissolving the affinity relationship between the particular client and the particular node in response to an expiration of a time-to-live period that applies to the affinity relationship.

13. The method of claim 11, further comprising:
if the measurement satisfies the specified criteria, then, during the second time interval, distributing, based on the load-balancing technique and not based on the affinity-based technique, requests from the one or more clients among the two or more nodes.

14. The method of claim 11, further comprising:
during the second time interval, obtaining a measurement of a quality of the system;
determining whether the quality has deteriorated to at least a specified degree during the second time interval;
in response to determining that the quality has deteriorated to at least the specified degree during the second time interval, distributing, based on the non-affinity load-balancing technique instead of the affinity-based technique, requests during a third time interval that is subsequent to the second time interval.

15. The method of claim 11, further comprising:
during the first time interval, obtaining a first measurement of a first cluster wait time in the system;
during the second time interval, obtaining a second measurement of a gradient of goodness for the system;

determining whether the second measurement is less than the first measurement; and in response to determining that the second measurement is not less than the first measurement, distributing, based on the non-affinity load-balancing technique instead of the affinity-based technique, requests during a third time interval that is subsequent to the second time interval.

16. The method of claim 11, further comprising:

during the first time interval, obtaining a first measurement of a first cluster wait time in the system;

during the second time interval, obtaining a second measurement of a gradient of goodness of the system;

during the second time interval, obtaining a measurement of a quality of the system;

determining whether the second measurement is less than the first measurement;

determining whether the quality has deteriorated to at least a specified degree during the second time interval; and in response to determining both that (a) the second measurement is less than the first measurement, and (b) the quality has not deteriorated to at least the specified degree during the second time interval, distributing, based on the affinity-based technique, requests during a third time interval that is subsequent to the second time interval.

17. A computer-readable non-transitory storage that stores instructions which, when executed by one or more processors, cause the one of more processors to perform the steps of:

a coordinator within a database server cluster (a) developing advice as to whether affinity-based routing would benefit a service at a node in the database server cluster and (b) posting the advice to one or more middle-tier servers that send requests to and receive responses from database servers in the database server cluster;

determining whether a potential gain in performance in the database server cluster can be achieved by using affinity-based routing in the database server cluster;

in response to determining that a potential gain in performance in the database server cluster can be achieved by using affinity-based routing in the database server cluster, recommending, in the advice, to distribute requests to nodes in the database server cluster to preserve client-to-node affinity for requests from the same client;

after recommending, collating performance characteristics of the database server cluster;

based on collating the performance characteristics, measuring a potential loss in performance in the database server cluster; and in response to measuring a potential loss in performance in the database server cluster, removing the advice to distribute requests to nodes in the database server cluster to preserve client-to-node affinity.

18. The computer-readable non-transitory storage of claim 17, further comprising:

determining an amount of time that affmity is expected to be beneficial based on a rate that data ages from caches of nodes in the database server cluster; and based on determining an amount of time that affmity is expected to be beneficial, publishing a time-to-live for affmity to be used by clients;

wherein affmity is temporal.

19. The computer-readable non-transitory storage of claim 17, wherein the step of developing advice comprises developing advice based on a characteristic of the database server cluster, and wherein the characteristic is a weighting of change in goodness, including response time and capacity, across multiple iterations, and wherein goodness is computed using a formula: $((G(n)_{max}-G(n)_{min})-(G(n-1)_{max}-G(n-1)_{min}))/(G(n-1)_{max-G(n-1)_{min}})$ for each iteration (n), where $G(n)_{max}$ is the maximum goodness measured during iternation (n), $G(n)_{min}$ is the minimum goodness measured during iteration (n), $G(n-1)_{max}$ is the maximum goodness measured during iteration (n-1), and $G(n-1)_{min}$ is the minimum goodness measured during iteration (n-1).

20. A computer-readable non-transitory storage that stores instructions which, when executed by one or more processors, cause the one of more processors to perform the steps of:

obtaining a measurement of a characteristic of a system;

determining whether the measurement satisfies specified criteria; and in response to determining that the measurement does not satisfy the specified criteria, distributing requests from one or more clients among two or more nodes of the system based on an affinity-based technique;

wherein distributing requests based on the affinity-based technique comprises sending all requests that come from each client of the one or more clients to a particular node of the two or more nodes while an affinity relationship exists between said each client and the particular node and a particular service; and wherein the characteristic is an average time taken by nodes in the system to receive replicas of data blocks that were requested from other nodes in the system; and wherein each node in the system is a separate database server instance with a cache that stores data blocks.

21. The computer-readable non-transitory storage of claim 20, wherein determining whether the measurement satisfies specified criteria comprises determining whether a gradient of goodness has deteriorated below a specified threshold.

22. The computer-readable non-transitory storage of claim 20, wherein the characteristic is based on both (a) cluster wait time and (b) capacities of nodes in the system.

23. The computer-readable non-transitory storage of claim 20, further comprising:

during a particular time interval, obtaining a measurement of a quality of the system;

determining whether a quality of the system has deteriorated to at least a specified degree during the particular time interval;

in response to determining that the quality has deteriorated to at least the specified degree during the particular time interval, posting advice to distribute, based on a load-balancing technique instead of an affmity-based technique, requests during a successive time interval that is subsequent to the particular time interval.

24. The computer-readable non-transitory storage of claim 20, further comprising:

during a first time interval, obtaining a first measurement of a first cluster wait time in the system;

during a second time interval, obtaining a second measurement of a second cluster wait time in the system;

determining whether the second measurement is less than the first measurement; and in response to determining that the second measurement is not less than the first measurement, posting advice to distribute, based on the load-balancing technique instead of the affmity-based technique, requests during a third time interval that is subsequent to the second time interval.

25. The computer-readable non-transitory storage of claim 20, further comprising:

during a first time interval, obtaining a first measurement of a first cluster wait time in the system and determining that a potential advantage can be gained by enabling affinity;

during a second time interval, obtaining iterative measures of a goodness of the system;

determining whether a gradient of the goodness is improving or stable;

in response to determining that (a) the gradient of the goodness is stable or improving, providing advice to distribute, based on the affinity-based technique, requests for subsequent measurement intervals; and iteratively verifying that the gradient of the goodness is stable or improving and updating the advice based on the gradient of the goodness.

26. The computer-readable non-transitory storage of claim 20, further comprising:

establishing an affinity context that extends preservation of a location that the client last used to the client whereby the affinity context comprises sufficient data to route the client back to the same database and instance that was used on a last request for a connection to the server;

wherein the affinity context is available for later requests to provide connections at the same or different connection pool managers and listeners.

27. A computer-readable non-transitory storage that stores instructions which, when executed by one or more processors, cause the one of more processors to perform the steps of:

during a first time interval, distributing, based on a non-affinity load-balancing technique, requests from one or more clients among two or more nodes in a system;

during the first time interval, obtaining a measurement of a characteristic of the system;

determining whether the measurement satisfies specified criteria; and if the measurement does not satisfy the specified criteria, then, during a second time interval that is subsequent to the first time interval, distributing requests from at least one of the one or more clients among the two or more nodes based on an affinity-based technique, thereby switching from the non-affinity load-balancing technique to the affinity-based technique in between the first time interval and the second time interval; and wherein distributing requests based on the affinity-based technique comprises sending all requests that come from a particular client to a particular node of the two or more nodes while an affinity relationship exists between the particular client and the particular node.

28. The computer-readable non-transitory storage of claim 27, further comprising:

dissolving the affinity relationship between the particular client and the particular node in response to an expiration of a time-to-live period that applies to the affinity relationship.

29. The computer-readable non-transitory storage of claim 27, further comprising:

if the measurement satisfies the specified criteria, then, during the second time interval, distributing, based on the load-balancing technique and not based on the affinity-based technique, requests from the one or more clients among the two or more nodes.

30. The computer-readable non-transitory storage of claim 27, further comprising:

during the second time interval, obtaining a measurement of a quality of the system;

determining whether the quality has deteriorated to at least a specified degree during the second time interval;

in response to determining that the quality has deteriorated to at least the specified degree during the second time interval, distributing, based on the non-affinity load-balancing technique instead of the affinity-based technique, requests during a third time interval that is subsequent to the second time interval.

31. The computer-readable non-transitory storage of claim 27, further comprising:

during the first time interval, obtaining a first measurement of a first cluster wait time in the system;

during the second time interval, obtaining a second measurement of a gradient of goodness for the system;

determining whether the second measurement is less than the first measurement; and in response to determining that the second measurement is not less than the first measurement, distributing, based on the non-affinity load-balancing technique instead of the affinity-based technique, requests during a third time interval that is subsequent to the second time interval.

32. The computer-readable non-transitory storage of claim 27, further comprising:

during the first time interval, obtaining a first measurement of a first cluster wait time in the system;

during the second time interval, obtaining a second measurement of a gradient of goodness of the system;

during the second time interval, obtaining a measurement of a quality of the system;

determining whether the second measurement is less than the first measurement;

determining whether the quality has deteriorated to at least a specified degree during the second time interval; and in response to determining both that (a) the second measurement is less than the first measurement, and (b) the quality has not deteriorated to at least the specified degree during the second time interval, distributing, based on the affinity-based technique, requests during a third time interval that is subsequent to the second time interval.

* * * * *

UNITED STATES PATENT AND TRADEMARK OFFICE
CERTIFICATE OF CORRECTION

PATENT NO. : 8,391,295 B2
APPLICATION NO. : 11/868317
DATED : March 5, 2013
INVENTOR(S) : Colrain et al.

Page 1 of 2

It is certified that error appears in the above-identified patent and that said Letters Patent is hereby corrected as shown below:

In the Specification

In column 7, line 20, delete "TOOLS" and insert -- POOLS --, therefor.

In column 11, line 42, delete "coordinated." and insert -- co-ordinated. --, therefor.

In column 12, line 24, delete "G(n-1)max" and insert -- $G(n-1)_{max}$ --, therefor.

In column 12, line 25-26, delete "G(n-1)min" and insert -- $G(n-1)_{min}$ --, therefor.

In the Claims

In column 18, line 49, in Claim 1, delete "client-to-node-affinity;" and insert
-- client-to-node affinity; --, therefor.

In column 19, line 2, in Claim 3, delete "$G(n-1)_{max}$is" and insert -- $G(n-1)_{max}$ is --, therefor.

In column 21, line 55, in Claim 18, delete "affmity" and insert -- affinity --, therefor.

In column 21, line 58, in Claim 18, delete "affmity" and insert -- affinity --, therefor.

In column 21, line 60, in Claim 18, delete "affmity" and insert -- affinity --, therefor.

In column 21, line 61, in Claim 18, delete "affmity" and insert -- affinity --, therefor.

In column 22, line 1-2, in Claim 19, delete
" $((G(n)_{max} - G(n)_{min}) - (G(n-1)_{max} - G(n-1)_{min}))/(G(n-1)_{max} - G(n-1)_{min})$ " and Signed and Sealed this
Second Day of July, 2013

Teresa Stanek Rea
*Acting Director of the United States Patent and Trademark Office*

CERTIFICATE OF CORRECTION (continued)
U.S. Pat. No. 8,391,295 B2 insert -- $((G(n)_{max} - G(n)_{min}) - (G(n-1)_{max} - G(n-1)_{min})) / (G(n-1)_{max} - G(n-1)_{min})$ --, therefor.

In column 22, line 3-4, in Claim 19, delete "iternation" and insert -- iteration --, therefor.

In column 22, line 48, in Claim 23, delete "affmity-based" and insert -- affinity-based --, therefor.

In column 22, line 63, in Claim 24, delete "affmity-based" and insert -- affinity-based --, therefor.

In column 23, line 11, in Claim 25, delete "affmity-based" and insert -- affinity-based --, therefor.

In column 23, line 18, in Claim 26, delete "affmity" and insert -- affinity --, therefor.

In column 23, line 20, in Claim 26, delete "affmity" and insert -- affinity --, therefor.

In column 23, line 23, in Claim 26, delete "affmity" and insert -- affinity --, therefor.

In column 23, line 51, in Claim 28, delete "affmity" and insert -- affinity --, therefor.

In column 24, line 6, in Claim 29, delete "affmity-based" and insert -- affinity-based --, therefor.

In column 24, line 17, in Claim 30, delete "affmity-based" and insert -- affinity-based --, therefor.

In column 24, line 31, in Claim 31, delete "affmity-based" and insert -- affinity-based --, therefor.